(12) United States Patent
Earnst

(10) Patent No.: US 8,437,469 B1
(45) Date of Patent: May 7, 2013

(54) ELECTRICAL PROTECTION DEVICE CONFIGURED TO REDUCE CROSSTALK CAUSED BY FUSES

(75) Inventor: Kevin Earnst, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 763 days.

(21) Appl. No.: 12/692,904

(22) Filed: Jan. 25, 2010

(51) Int. Cl.
*H04M 1/00* (2006.01)
(52) U.S. Cl.
USPC ................................. 379/412; 379/392.01
(58) Field of Classification Search .................... 379/412
See application file for complete search history.

(56) References Cited

U.S. PATENT DOCUMENTS

| | | | |
|---|---|---|---|
| 5,618,185 A | 4/1997 | Aekins | 439/76.1 |
| 5,716,237 A | 2/1998 | Conorich et al. | 439/660 |
| 5,864,089 A | 1/1999 | Rainal | 174/35 C |
| 6,065,994 A | 5/2000 | Hashim et al. | 439/404 |
| 6,116,965 A | 9/2000 | Arnett et al. | 439/692 |
| 6,139,371 A | 10/2000 | Troutman et al. | 439/676 |
| 6,165,023 A | 12/2000 | Troutman et al. | 439/676 |
| 6,193,555 B1 | 2/2001 | Chang | 439/608 |
| 6,206,734 B1 | 3/2001 | Liu | 439/676 |
| 6,328,602 B1 | 12/2001 | Yamasaki et al. | 439/608 |
| 6,833,513 B1 | 12/2004 | Ahmad | 174/262 |
| 6,910,922 B2 | 6/2005 | Haga | 439/608 |
| 6,958,609 B2 * | 10/2005 | Raftery et al. | 324/321 |
| 7,186,149 B2 | 3/2007 | Hashim | 439/676 |
| 7,371,118 B2 | 5/2008 | Wu | 439/610 |
| 7,410,366 B2 | 8/2008 | Wu | 439/76.1 |
| 7,435,107 B2 | 10/2008 | Masumoto et al. | 439/79 |
| 7,438,583 B2 | 10/2008 | AbuGhazaleh et al. | 439/344 |
| 7,459,985 B2 | 12/2008 | Mellitz et al. | 333/5 |
| 7,605,444 B2 * | 10/2009 | Bang et al. | 257/529 |

* cited by examiner

*Primary Examiner* — Simon Sing
(74) *Attorney, Agent, or Firm* — Fish & Richardson P.C.

(57) ABSTRACT

In accordance with a non-limiting example, an electrical protection device includes a fuse housing and a plurality of fuses carried by the fuse housing and arranged in a plurality of Tip/Ring fuse pairs. The Tip/Ring fuse pairs are arranged in vertical and horizontal orientation of Tip/Ring fuse pairs and spaced to each other such that differential crosstalk among the Tip/Ring fuse pairs is cancelled.

25 Claims, 7 Drawing Sheets

US 8,437,469 B1

ELECTRICAL PROTECTION DEVICE CONFIGURED TO REDUCE CROSSTALK CAUSED BY FUSES

FIELD OF THE INVENTION

This invention relates to electrical protection devices, and more particularly, this invention relates to electrical protection devices that reduce crosstalk caused by fuses.

BACKGROUND OF THE INVENTION

High-speed DSL (Digital Subscriber Line) equipment and associated communications lines are sensitive to crosstalk and characteristic impedance abnormalities of the DSL pairs. A particular DSL technology will typically suffer from these two abnormalities when the frequency content used by the particular DSL transceiver has a significant high frequency content. One example is very high bit rate DSL, Discrete Multitone (VDSL-DMT), which can have frequency content of up to about 30 MHz.

Multiple port, high-speed DSL products present a significant challenge in product design to minimize crosstalk between the multiple DSL pairs within the confined area of a printed circuit board (PCB) carried by the product. Typically, an electrical protection scheme, such as two fuses, is used for each DSL pair. One fuse protects one of the two wires, while the second fuse protects the other wire. These fuses are relatively large and usually not ideal for higher speed DSL applications. These fuses also generally cannot be placed on the printed circuit board to yield optimal differential characteristic impedance for each DSL pair. Moreover, the inherent spacing between the two fuses for each DSL pair makes it difficult to reduce crosstalk to/from the other DSL pairs in cases where the PCB restricts the area for DSL fuse placement. The large end caps typical to most fuses also compounds the crosstalk problem. These end caps act as capacitive plates that increase crosstalk coupling between adjacent pairs and reduce the characteristic impedance within each DSL pair. This makes it difficult to reach the normal characteristic impedance of 100 ohms of normal twisted pair wire. Thus, the spacing and design of fuses can become important in these communications applications.

In one particular example, a similar technical problem occurred when operating a TA3000 system manufactured by ADTRAN, INC. of Huntsville, Ala., under a particular set of circumstances. In this one particular example, the crosstalk and impedance mismatching became significant issues with the introduction of the VDSL line card. Prior to its introduction, the highest frequency content that was run over, the TA3000 backplane was 2.5 MHz associated with ADSL2+ line cards. With VDSL operating frequencies extending well beyond 2.5 MHz, the crosstalk dramatically increased. In addition, this system had long runs of DSL pairs across its backplane from the connection between the backplane line card connector to the backplane DSL pair connector. These long runs were relatively far away from the desired 100 ohm characteristic impedance needed for optimal VDSL operation.

SUMMARY OF THE INVENTION

In accordance with a non-limiting example, an electrical protection device includes a fuse housing and a plurality of fuses carried by the fuse housing and arranged in a plurality of Tip/Ring fuse pairs. The Tip/Ring fuse pairs are arranged in vertical and horizontal orientations of Tip/Ring fuse pairs and spaced to each other such that differential crosstalk among the Tip/Ring fuse pairs is cancelled. It should be understood that some manufacturing tolerances typically cause a reduction from that of "perfect cancellation."

In one example, the Tip/Ring fuse pairs are positioned substantially linearly with each other within the fuse housing and arranged in alternating vertical and horizontal orientation. At least a plurality of Tip/Ring fuse pairs are positioned within the fuse housing in one example. In another aspect, a communications connector is connected to the fuse housing and includes terminals connected to the fuses. The fuse housing in this example includes a rear face and each Tip/Ring fuse pair comprises a pair of wire conductors that extend through the rear face of the fuse body and exit therefrom as connector pins for respective Tip/Ring terminal pairs. In another example, a connector pin has a horizontal section and a riser section that extends downward from the horizontal section to engage a circuit board to which the fuse body is supported. In another aspect, a plurality of fuse holders carries a respective fuse within the fuse housing. Each fuse holder carries a respective Tip/Ring fuse pair. A fuse housing includes fuse holder sockets into which fuses are removeably received.

In yet another example, the electrical connection device includes the fuse housing and a plurality of fuses carried by the fuse housing and arranged in a plurality of Tip/Ring fuse pairs that are arranged linearly and in alternating vertical and horizontal orientation. An adjacent two Tip/Ring fuse pairs that are adjacent are spaced such that the distance from a centerline of a vertically oriented Tip fuse on a first Tip/Ring fuse pair to a centerline of a horizontally oriented Tip fuse on a second adjacent Tip/Ring fuse pair and the distance between a centerline of the Ring fuse on the first Tip/Ring fuse pair and a centerline on the Tip fuse on the second Tip/Ring fuse pair are substantially the same distance d1. The distance from a centerline of the vertically oriented Tip fuse on the first Tip/Ring fuse pair to a centerline of the horizontally oriented Ring fuse on the second Tip/Ring fuse pair and the distance between a centerline of the Ring fuse on the first Tip/Ring fuse pair and a centerline of the Ring fuse on the second Tip/Ring fuse pair are substantially the same distance d2 wherein the distances d1 and d2 are such that differential crosstalk among Tip/Ring fuse pairs is cancelled.

In yet another example, an electrical protection system is disclosed. A plurality of fuse housing bodies are positioned linearly and adjacent to each other. A pair of fuses are positioned in each fuse housing body and arranged as a Tip/Ring fuse pair in one of a vertical or horizontal configuration. Each of the fuse housing bodies are arranged adjacent to each other such that the Tip/Ring fuse pairs are arranged in alternating vertical and horizontal orientation and spaced to each other a distance such that differential crosstalk among the Tip/Ring fused pairs is cancelled.

In another example, an adjacent two fuse housing bodies are spaced such that the distance from a centerline of the vertically oriented tip fuse in a first fuse housing body to a centerline of the horizontally oriented tip fuse in a second adjacent fuse housing body and the distance between a centerline of the ring fuse in the first fuse housing body and a centerline of the tip fuse in the second fuse housing body are substantially the same distance. An adjacent two fuse housing bodies are spaced such that the distance from a centerline of the vertically oriented tip fuse in a first fuse housing body to a centerline of the horizontally oriented ring fuse in a second adjacent fuse housing body and the distance between a centerline of the ring fuse in the first fuse housing body and a centerline of the ring fuse in the second fuse housing body are substantially the same distance.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 3A:
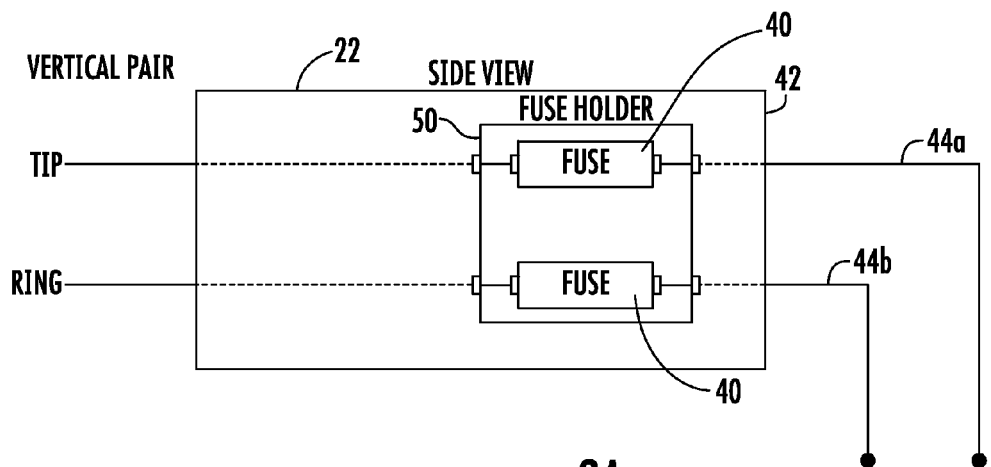
FIGS. 3A and 3B are views similar to those views shown in FIGS. 2A and 2B, but showing each respective Tip/Ring fuse pair carried by a monolithic "double" fuse holder.
Figure 3B:
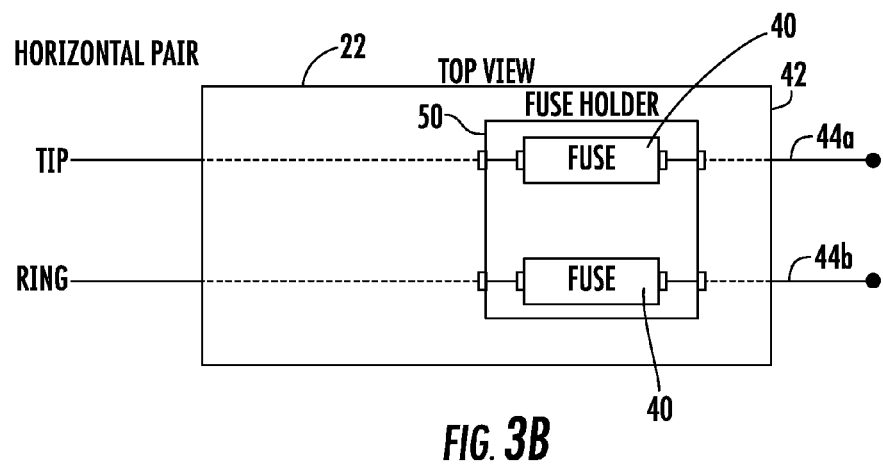
Figure 4:
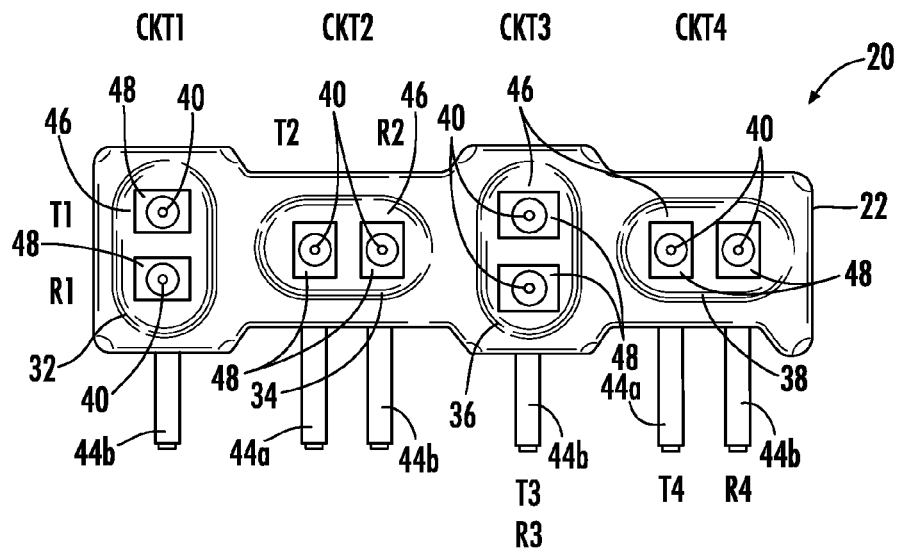
FIG. 4 is a front plan view of the electrical protection device in accordance with a non-limiting example and showing the alternating vertical and horizontal orientation of the Tip/Ring fuse pairs and showing each fuse carried by a single fuse holder and inserted within fuse holder sockets of the fuse housing to facilitate ready replacement of "blown" fuses.

Referring now to FIGS. 1-7, there is illustrated the electrical protection device, in accordance with a non-limiting example, which reduces crosstalk and DSL caused by fuses. To address the crosstalk problem between DSL Tip/Ring fuse pairs, the fuses are geometrically arranged such that those fuses associated with a DSL pair are in a crosstalk-friendly relationship with the other DSL fuses for adjacent pairs. Although this electrical protection device is described relative to DSL Tip/Ring fuse pairs, the Tip/Ring fuse configuration as described can be used for different communications applications where fuse crosstalk is problematic. In one aspect, the electrical protection device includes a fuse housing and a plurality of fuses carried by the fuse housing and arranged in a plurality of Tip/Ring fuse pairs. The Tip/Ring fuse pairs are arranged in vertical and horizontal orientation of Tip/Ring fuse pairs and spaced to each other such that the differential crosstalk among the Tip/Ring fuse pairs is cancelled. The Tip/Ring fuse pairs in one aspect are positioned linearly with each other and arranged in alternating vertical and horizontal orientation. On a standard two-dimensional mathematical grid, the center lines of alternating fuse pairs always form a 90 degree relationship as shown in FIG. 4.

Figure 1:
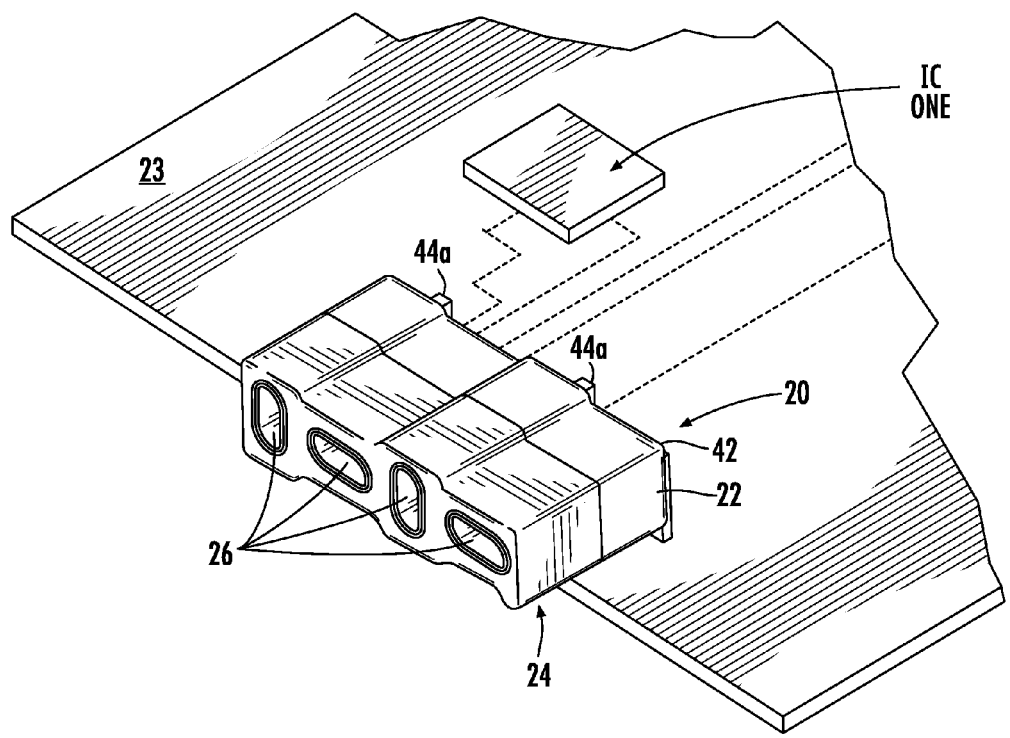
FIG. 1 is a perspective view of the electrical protection device in accordance with a non-limiting example and shown connected to a communications connector and both positioned on a printed circuit board (PCB).

FIG. 1 illustrates a fragmentary perspective view of the electrical protection device 20 that includes a fuse housing 22 mounted on a printed circuit board 23. In this illustrated example, a communications connector 24 is connected to the device 20 and its fuse housing. Connector terminals 26 extend through the communications connector 24 and connect to the fuses (not illustrated in this example). The electrical protection device 20 is shown formed in a similar configuration as the communications connector 24 because when the two are combined together as illustrated, they form an integral unit in this example. The communications connector 24 could be removed and any fuses replaced in the device 20 when a fuse is "blown." An example communications connector 24 is disclosed in commonly assigned U.S. patent application Ser. No. 12/506,285, filed Jul. 21, 2009, the disclosure which is hereby incorporated by reference in its entirety.

The electrical protection device 20 could be formed with many different types of configurations as long as the alternating arrangement of fuses as explained below is maintained. This configuration, similar to the communications connector 24, is illustrated since in one embodiment, they are secured closely together and similar manufacturing techniques can be used to produce not only the communications connector 24, but also the electrical protection device 20 and the disclosed fuse housing 22 as explained below.

It should be understood that the electrical protection device 20 does not have to be connected to any communications connector, but in this particular example, the communications connector 24 is shown connected to the fuse housing 22. FIGS. 4-7 are an example of the electrical protection device 20 shown without any communications connector connected thereto. The electrical protection device 20 can be used alone without any communications connector 24 and positioned on a circuit board and various wire leads or other electrical connector systems connected to each fuse lead or other fuse contact at an individual fuse depending on the type of connection system that is used.

Figure 6:
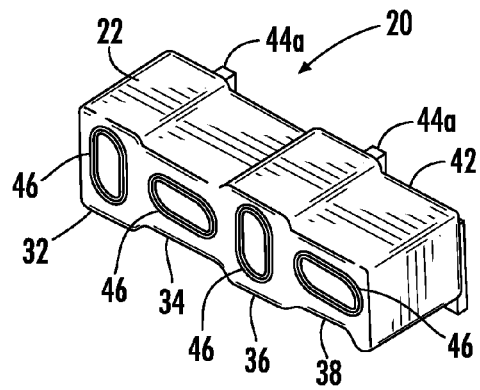
FIG. 6 is a front perspective view of the electrical protection device shown in FIG. 4 in accordance with a non-limiting example.

As shown in the front elevation view of FIG. 4 and the front perspective view of FIG. 6, at least three Tip/Ring fuse pairs are positioned within the fuse housing 22 of the electrical protection device, and in this illustrated embodiment, four Tip/Ring fuse pairs numbered 32, 34, 36, and 38 are illustrated and also given the designation ckt1, ckt2, ckt3 and ckt4 (corresponding to fuse circuits).

As best seen in FIG. 4, the electrical protection device 20 includes the fuse housing 22 and the plurality of fuses (each given the reference numeral 40) and carried by the fuse housing and arranged in the plurality of Tip/Ring fuse pairs. The Tip/Ring fuse pairs are positioned linearly with each other and within the fuse housing 22 and arranged in the illustrated alternating vertical and horizontal orientation. An adjacent two Tip/Ring fuse pairs are spaced such that the distance from a centerline of a vertically oriented tip fuse on a first Tip/Ring fuse pair to a centerline of a horizontally oriented tip fuse on a second adjacent Tip/Ring fuse pair and the distance between a centerline of the ring fuse on the first Tip/Ring fuse pair and a centerline of the tip fuse on the second Tip/Ring fuse pair are substantially the same distance D1. The distance from a centerline of the vertically oriented tip fuse on the first Tip/Ring fuse pair to a centerline of the horizontally oriented ring fuse on the second Tip/Ring fuse pair and a centerline of the distance between the ring fuse on the first Tip/Ring fuse pair and a centerline of the ring fuse on the second Tip/Ring fuse pair are substantially the same distance D2 wherein the distances D1 and D2 are such that the differential crosstalk among the Tip/Ring fuses is cancelled.

In one non-limiting example, the signal that is capacitively coupled to a tip fuse of the second Tip/Ring fuse pair as explained above is one-half of the amplitude of the differential signal present at the first Tip/Ring fuse pair plus any DC offset at the first Tip/Ring fuse pair. Likewise, the signal that is capacitively coupled to the ring fuse of the second Tip/Ring fuse pair is one-half of the amplitude of the differential signal present at the first Tip/Ring fuse pair plus any DC offset at the first Tip/Ring fuse pair. As such, no differential coupling/crosstalk is observed at the second Tip/Ring fuse pair. The magnetic coupling between the two Tip/Ring fuse pairs is effectively non-existent because of the 90-degree change in orientation between adjacent fuse pairs. With this arrangement, the magnetic field lines from one Tip/Ring fuse pair produce no magnetic flux through the adjacent Tip/Ring fuse pairs.

Figure 4A:
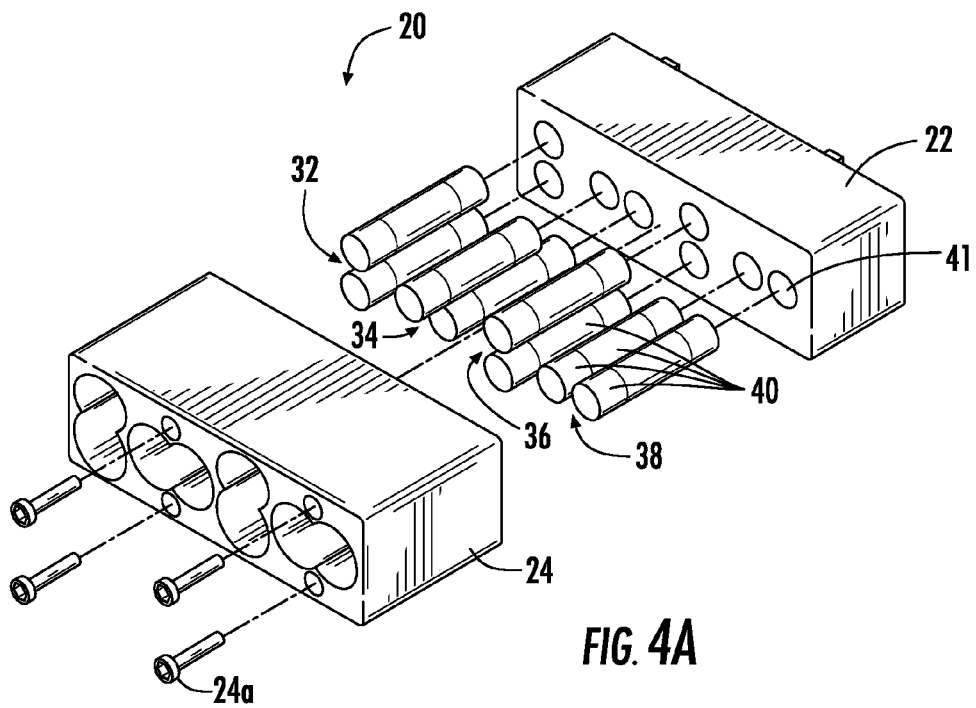
FIG. 4A is an exploded isometric view of the electrical protection device in accordance with a non-limiting example and showing an example of the fuse housing having fuse holder sockets formed as an opening or hollow to which individual fuses are inserted and held therein when the communications connector and fuse housing are secured together.

FIG. 4A is another example of the electrical protection device 20 that provides a convenient technique to hold fuses 40 such that the fuses can be readily replaced. As illustrated, the fuse housing 22 includes a plurality of fuse holder sockets 41 that are formed as openings or hollows that each receive a single fuse. The sockets 41 are arranged in the configuration such as described relative to FIG. 4. The rear side of the communications connector 24 can include sockets or openings (not illustrated) that receive the front part of the fuses. The communications connector is secured to the fuse housing 22 in this non-limiting example using screws 24a. When the communications connector 24 is secured to the fuse housing 22, the fuses 40 are retained within the fuse housing 22.

Figure 5:
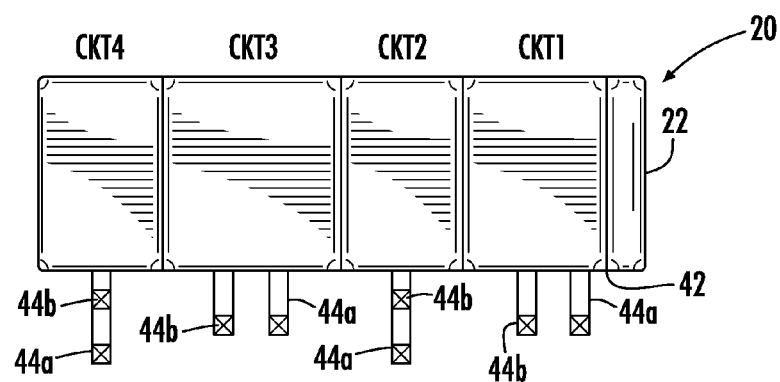
FIG. 5 is a top plan view of the electrical protection device shown in FIG. 4 in accordance with a non-limiting example.
Figure 7:
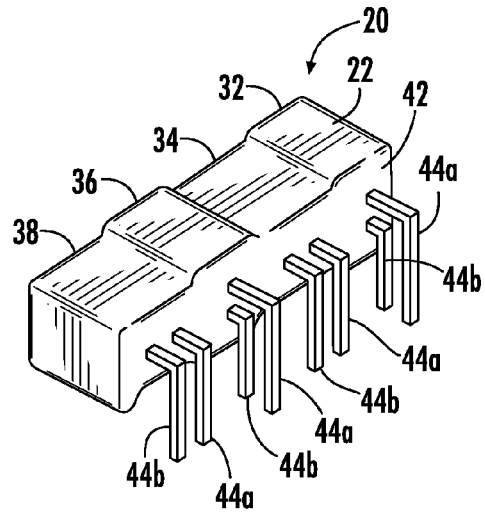
FIG. 7 is a rear perspective view of the electrical protection device shown in FIG. 4 in accordance with a non-limiting example.

As shown in FIGS. 5-7, the fuse housing 22 includes a rear face 42 and each Tip/Ring fuse pair 32-38 having a pair of wire conductors that extend through the rear face of the fuse body and exit therefrom as connector pins 44a, 44b for the respective Tip/Ring terminal pairs. Each Tip/Ring fuse pair 32-38 includes a connector pin 44a, 44b having a horizontal section and a riser section that extends downward from the horizontal section to engage a circuit board to which the fuse body 22 is supported. To address the characteristic impedance problem associated with Tip/Ring fuses, it is possible to change the spacing between the fuses within a single Tip/Ring fuse pair or select the material between the fuses to obtain the desired differential characteristic impedance.

Although four Tip/Ring fuse pairs 32-38 are illustrated, it should be understood that any number "n" of Tip/Ring fuse pairs could be used and supported within the fuse housing 22 as long as the alternating vertical and horizontal configuration as described is used. Typically, at least two Tip/Ring terminal pairs are used. Different types of fuse housing configurations can be used as long as the alternating vertical and horizontal orientation of the Tip/Ring fuse pairs is maintained to cancel the differential crosstalk. As illustrated, one preferred configuration has the fuse housing formed as a substantially rectangular configured fuse housing having a front face in front plan view as illustrated and supporting the four Tip/Ring fuse pairs. The fuse housing is formed typically from a dielectric material to prevent arcing between various fuses and provide mechanical stability. As noted before, it is formed in a similar manner as the communications connector 24 shown in FIG. 1.

Figure 2A:
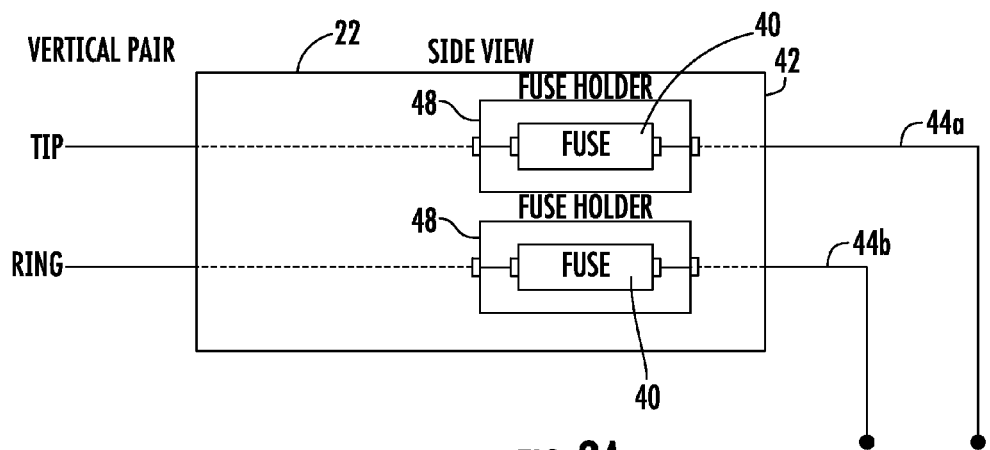
FIG. 2A is a fragmentary side elevation view of the electrical protection device and showing two vertically oriented fuses forming a Tip/Ring fuse pair and each fuse carried by a respective single fuse holder in accordance with a non-limiting example.
Figure 2B:
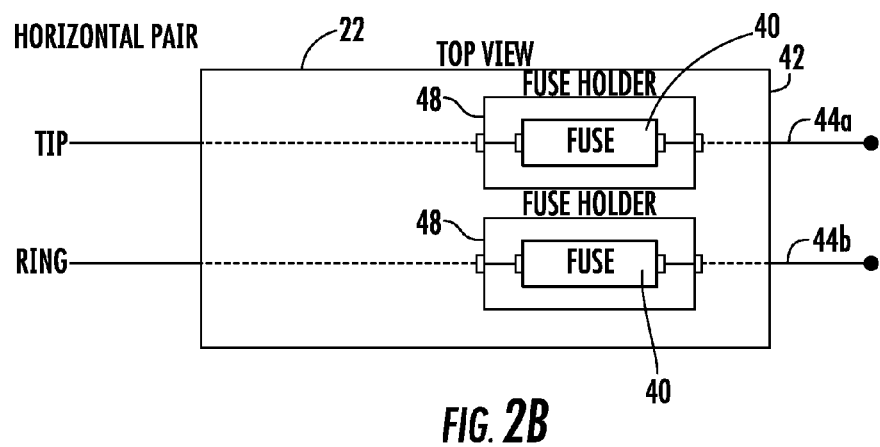
FIG. 2B is a fragmentary top plan view of the electrical protection device and showing a horizontal orientation of a Tip/Ring fuse pair and each fuse carried by a respective single fuse holder in accordance with a non-limiting example.

As shown, four fuse holder sockets 46 extend into the fuse housing 22 and a fuse holder 48 carries a single Tip or Ring fuse and is removably received within a socket 46 to enhance fuse replacement within the fuse housing when a fuse is to be replaced. A fuse holder 48 can be pulled and replaced as necessary. The fuse holders 48 also ensure better alignment in a proper position. FIGS. 2A, 2B, 3A and 3B show the two different types of fuse holders. As shown in FIGS. 2A and 2B, the "single" monolithic fuse holders 48 each carry one respective fuse, while in FIGS. 3A and 3B the "double" monolithic fuse holders 50 carry a respective Tip/Ring fuse pair as illustrated. The fuse holders (whether single or double) are advantageous because they are each configured in this one non-limiting example to be inserted within each fuse holder socket 46 as illustrated. The fuse holders 48, 50 can be designed such that each Tip or Ring fuse engages a wire lead in the socket that extends through the housing to become the respective connector pin and thus make contact with a PCB. When a fuse 40 is "blown" such as through excess current, the fuse can be readily removed from the fuse holder socket 46 and replaced with a new fuse. In the example of FIG. 4A, the fuse is simply removed from the socket 41 and replaced. In other examples, a fuse holder holding a fuse is replaced. Because typically a Tip/Ring fuse pair are often overloaded or destroyed together and both fuses are positioned together as a pair and replaced, the fuse holder can contain a single Tip/Ring fuse pair as shown in FIGS. 3A and 3B to facilitate replacement. The crosstalk cancellation method is the same as described whether a single fuse 40 is contained within a single fuse holder 48 or a Tip/Ring fuse pair is contained in a double fuse holder 50. Furthermore, variations of the specific number of fuse pairs held in a fuse holder are possible to reduce crosstalk between adjacent DSL pairs as long as the geometry between adjacent fuse pairs are maintained in the manner discussed previously. For example, a monolithic fuse holder could contain four pairs of fuses arranged in a single row with alternating vertical and horizontal relationships. Another monolithic fuse holder could contain eight pairs arranged in a single row with alternating vertical and horizontal relationships.

Figure 8:
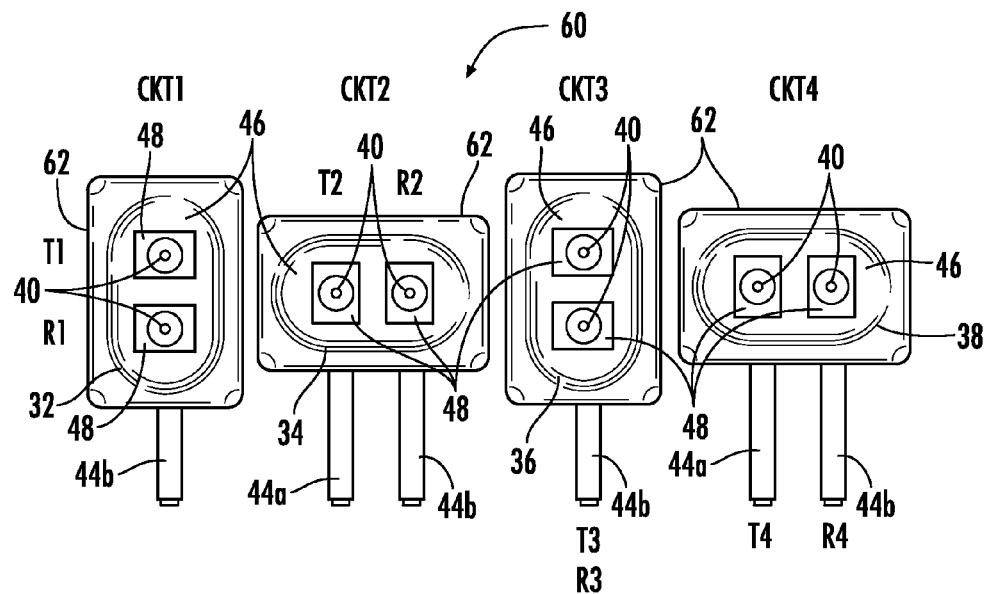
FIG. 8 is a front plan view of an electrical protection system in accordance with a non-limiting example and showing a plurality of fuse housing bodies with each fuse housing body carrying a Tip/Ring fuse pair and each fuse carried by a single fuse holder.
Figure 9:
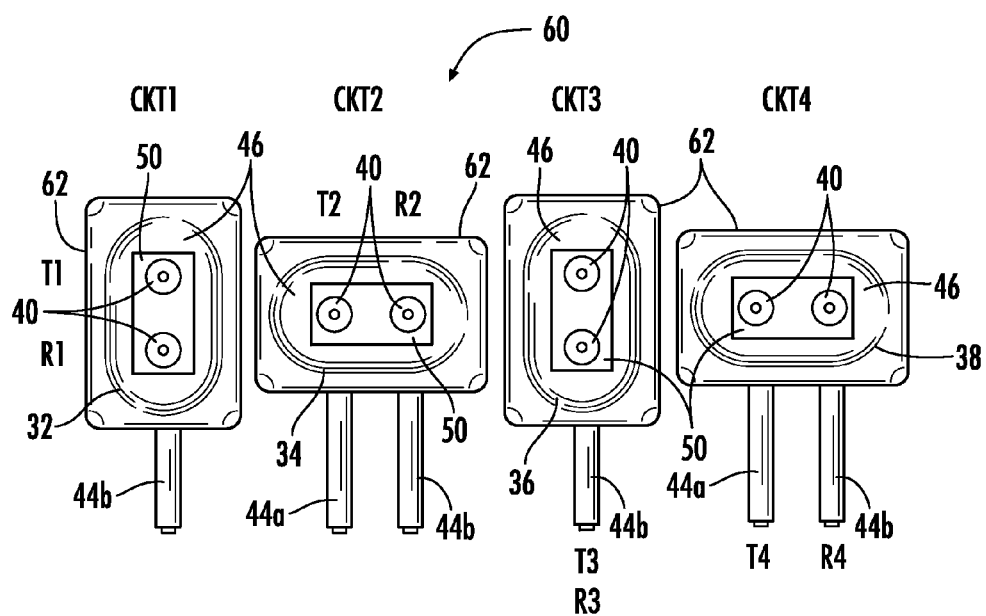
FIG. 9 is a front plan view of the electrical protection system similar to that shown in FIG. 8, but showing a monolithic "double" fuse holder carried in each fuse housing body and carrying a respective Tip/Ring fuse pair such that one monolithic fuse holder carries two fuses forming a Tip/Ring pair.
Figure 10:
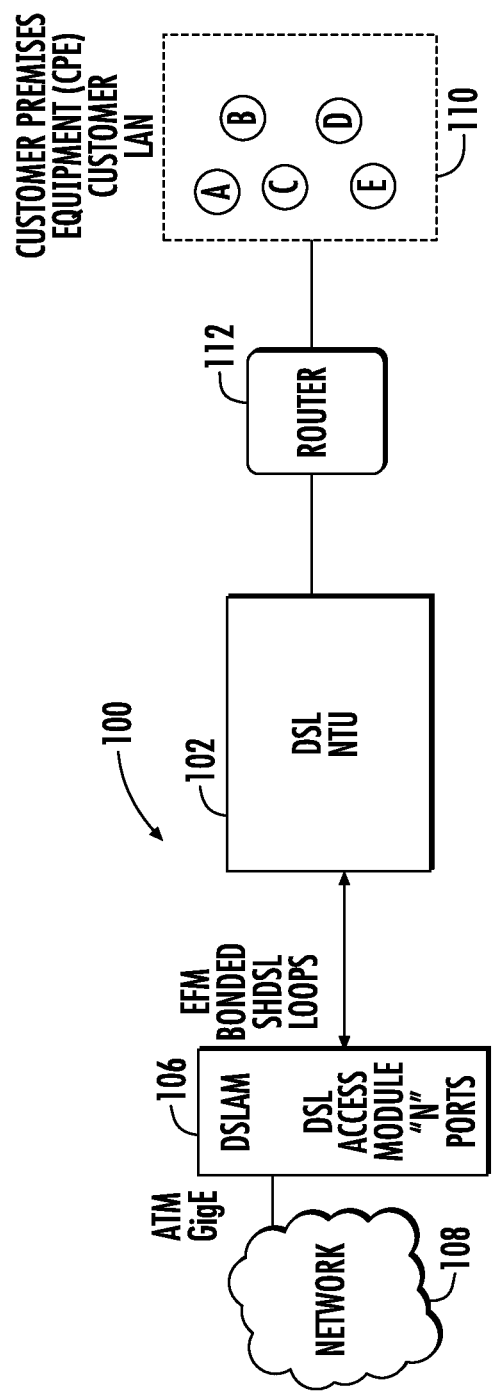
FIG. 10 is a block diagram of a communication system showing a Digital Subscriber Line Access Multiplexer (DSLAM) connected to a Network Termination Unit (NTU) that may incorporate various line cards such as part of a TA3000 system and incorporate the electrical protection device and system used with line cards in accordance with a non-limiting example.

FIGS. 8 and 9 show a different embodiment and an electrical protection system 60 where a plurality (four as illustrated) of fuse housing bodies 62 are positioned linearly and adjacent to each other. A pair of fuses (also given the numeral reference 40 as in previous figures) are positioned in each fuse housing body 62 and arranged as a Tip/Ring fuse pair in one of a vertical or horizontal configuration as illustrated. The same numeral reference designation for the Tip/Ring pairs is used. Each of the fuse housing bodies 62 are arranged adjacent to each other such that the Tip/Ring fuse pairs are arranged in alternating vertical and horizontal orientation and spaced to each other a distance such that differential crosstalk among the Tip/Ring fuse pairs is cancelled in the same manner as described before.

FIG. 8 shows an example in which each fuse 40 is contained in a respective monolithic single fuse holder 48 and received within a fuse holder socket 46 in each fuse housing body 62. The fuse holder sockets 46 are formed similarly as those fuse holder sockets 46 in the one integrated fuse housing 22 shown in FIGS. 1-7.

In FIG. 9, on the other hand, a monolithic double fuse holder 50 carries a respective Tip/Ring fuse pair, and thus, carries two fuses in one fuse holder. When a respective Tip or Ring fuse is "blown," typically the pair is removed such as shown in the embodiment of FIG. 9 where a single monolithic fuse holder 50 is used and replaced with a new double fuse holder 50, containing the Tip/Ring fuse pair and inserted within the fuse holder socket 46. Again, the functionality of replacing the fuses and using fuse holders is the same as in the embodiments shown in FIGS. 1-7.

It should be understood that the fuse housing 22 or fuse housing bodies 62 as illustrated have the various Tip/Ring fuse pairs for application to an ADSL (or VDSL) or similar DSL systems. The wire conductors extend and exit as the connector pins 44a, 44b for respective Tip/Ring fuse pairs in these non-limiting examples. It is possible that the connector pins 44a, 44b can be configured for wire wrapping connections for customer wiring connections.

Some hypothetical measurements regarding crosstalk reduction are now set forth. These are similar measurements applied to a communications connector 24 set forth in the copending and incorporated by reference '285 application and as applied to connector terminals, but in this instance, applied to the fuse configuration. Crosstalk measurements as applied to this connector in the '285 incorporated by reference application are also applicable.

Case 1—excite ckt1 with dm excitation and observe ckt2 dm response. Apply +Va/2 to T1 and −Va/2 to R1 in ckt1 for a differential mode voltage of Va. By the symmetry of the geometry of the protection device such as shown in FIG. 4, the following distances are the same: (a) T1 to T2 and R1 to T2, call them both d1; and (b) T1 to R2 and R1 to R2, call them both d2. This results in a differential response Vout2_dm on ckt2 given by:

Vout2_dm =

$$V\_T2 - V\_R2 = \left[\frac{Va}{2} \cdot \frac{1}{d1} - \frac{Va}{2} \cdot \frac{1}{d1} - \left(\frac{Va}{2} \cdot \frac{1}{d2} - \frac{Va}{2} \cdot \frac{1}{d2}\right)\right] \cdot kd$$

$$\frac{Vout2\_dm}{Va} = 0$$

Case 2—excite ckt1 with dm excitation, observe ckt2 cm response:

Vout2_cm =

$$\frac{V\_T2 + V\_R2}{2} = \frac{\left[\frac{Va}{2} \cdot \frac{1}{d1} - \frac{Va}{2} \cdot \frac{1}{d1} + \left(\frac{Va}{2} \cdot \frac{1}{d2} - \frac{Va}{2} \cdot \frac{1}{d2}\right)\right] \cdot kd}{2}$$

$$\frac{Vout2\_cm}{Va} = 0$$

Case 3—excite ckt1 with cm excitation, observe ckt2 dm response:

Vout2_dm =

$$V\_T2 - V\_R2 = \left[Va \cdot \frac{1}{d1} + Va \cdot \frac{1}{d1} - \left(Va \cdot \frac{1}{d2} + Va \cdot \frac{1}{d2}\right)\right] \cdot kd$$

$$\frac{Vout2\_dm}{Va} = -2 \cdot (-d2 + d1) \cdot \frac{kd}{d1 \cdot d2}$$

Case 4—excite ckt1 with cm excitation, observe ckt2 cm response:

Vout2_dm =

$$V\_T2 - V\_R2 = \left[Va \cdot \frac{1}{d1} + Va \cdot \frac{1}{d1} + \left(Va \cdot \frac{1}{d2} + Va \cdot \frac{1}{d2}\right)\right] \cdot kd$$

$$\frac{Vout2\_cm}{Va} = 2 \cdot (d2 + d1) \cdot \frac{kd}{d1 \cdot d2}$$

Owing to the symmetry of this protection device as illustrated and explained above, dm-dm crosstalk is substantially perfect in theory. The data transmission signals are carried as dm (differential mode signals), and the power in the common mode signal is negligible by design. Case 2 indicates the common mode signal resulting from differential excitation is also zero. The reciprocity theorem informs one that the calculated results are valid if the source and the receiver are swapped. Thus, these results apply for aggressors on pair 2 and receivers on pair 1 corresponding to ckt1 and ckt2.

The electrical protection device and system shown in FIGS. 1-9 can mount directly on a PCB with any shaft of the connector pins 44a, 44b perpendicular to a plane of the printed circuit board. It could also beneficial, however, to have a right-angle connector, where the mating portion of the connector pin shaft is parallel to the plane of the PC board. If the protection device maintains the beneficial symmetry described above, it is possible to cancel crosstalk in the portions of the connector pins that mate with the PC board.

The electrical protection device as illustrated is formed to have alternate horizontal and vertical orientations of the connector pins 44a, 44b and a symmetric placement to cancel differential-differential crosstalk in the riser section of the connector pin. This is clearly shown in the view from below the communications connector. The riser section is defined as that part of the connector pin that rises from the PCB towards the right angle transition at the horizontal section.

The pattern as shown results in a slight asymmetry. The portion of the T1 conductor parallel to the plane of the board is slightly longer than the same portion of the R1 conductor as shown in FIG. 7.

It is also possible to form the "double" fuse configuration with the double fuse holder as a "dual" fuse that incorporates a pair of electrical lines instead of a single electrical line. As is known, a typical fuse element has a single electrical line connected to its fuse element, which is normally encased in an enclosure, such as glass or plastic. Although the fuse holder described above is explained as if the fuse is encased, the "double" fuse holder could include two Tip/Ring lines also. When the fuse blows, the fuse material contained within the enclosure or fuse holder does not present any safety, fire, or electrical hazard. The new "dual" fuse would have two fuse elements encased in a single enclosure. The two fuse elements can be spaced closer together inside a single enclosure than they can when they are inside separate enclosures. The closer spacing between the two fuse elements inside a single enclosure achieves a differential characteristic impedance that is more ideal for the high speed DSL technologies. The closer spacing also reduces the DSL pair to pair spacing that is required for crosstalk reduction. Even if one of the two fuse elements causes the other fuse element to blow (e.g. spews molten metal on the other fusing element), this is not a problem since the DSL technology cannot function on just a single operational wire. As an additional bonus, this new "dual" fuse can be manufactured in two versions to gain the crosstalk advantages described in the geometric configuration as described. The first version of the dual fuse can be manufactured in a vertical stack up and the second version can be manufactured in a horizontal stack up in the same geometrical arrangement previously described, thus, minimizing crosstalk.

A telecommunications system is shown generally at 100 as an example of a type of system that may use the electrical protection device in accordance with a non-limiting example. The system includes an NTU 102 that connects into a DSLAM 106, for example, an SHDSL access module with "n" ports. The DSLAM 106 is connected into a communications network 108 such as through an ATM or Gigabyte Ethernet (GIG E) communications link. Communication between the NTU and DSLAM can be a connection that includes EFM (Ethernet over First Mile) bonded SHDSL loops. The customer Local Area Network 110 includes various communications devices illustrated as devices A-E as part of Customer Premises Equipment (CPE). An Ethernet router 112 connects the NTU 102 and customer LAN 110 in this particular example. In one non-limiting example, the SHDSL NTU 102 can be a Total Access (TA) 838 NTU such as manufactured by ADTRAN, INC. and connect through up to eight EFM bonded SHDSL loops with the DSLAM, which in one example could be a 16 port SHDSL access module such as a Total Access 3000 DSLAM as manufactured by ADTRAN, INC. The network interface can be the Ethernet or ATM upstream with the subscriber interface.

When launched from the Total Access 3000 or Total Access 5000 platforms as manufactured by ADTRAN, INC., the DSLAM 106 and the NTU 102 deliver up to 45 Mbps of Ethernet service over a bonded e.SHDSL. This Ethernet over Copper (EoCu) solution enables service providers to extend packet-based business class services beyond the reach of fiber networks by leveraging the existing investment of cooper-based TDM business services assets. This leverages the full advantages of TDM. It should be understood that carrier Ethernet over TDM (Eo TDM) allows service providers to deliver services to any business that is serviced by TDM services today, which means delivering to customers that reside both on and off the network.

The DSLAM can use Metro Ethernet Form (MEF) certified parts with individual configurable ports. It can include enhanced SHDSL data-rate performance of up to 5 Mbps/pair. It also includes a System Controller Unit (SCU) and a complement of ATM or Ethernet switches in this example. Each 16 port e.SHDSL module can occupy two slots in the DSLAM shelf, allowing 224 subscribers per single chassis. Each SHDSL port can be individually configurable at support rates from 192 Kbps to 5.7 Mbps over a single copper pair. It can include a two-wire/four-wire version that provides SHDSL and e.SHDSL for single and two-pair operation. The IMA version can provide up to eight pairs of SHDSL or e.SHDSL to be bonded together. An EFM version can provide up to eight pairs of SHDSL or e.SHDSL to be bonded together using Ethernet in the first mile (EFM) to deliver up to 45 Mbps to the customer. Each SHDSL circuit can use a Trellis coded Pulse Amplitude Modulation (TCPAM) line code scheme that ensures spectral compatibility with existing binder group services. The unit can terminate two and eight pairs that are respectively bonded using EFM and each of the devices can provide multiple 10/100 Ethernet interfaces to a customer premises.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electrical protection device, comprising:
a fuse housing; and
a plurality of fuses carried by the fuse housing and arranged in a plurality of Tip/Ring fuse pairs, wherein the Tip/Ring fuse pairs are arranged in vertical and horizontal orientation of Tip/Ring fuse pairs and spaced to each other such that differential crosstalk among the Tip/Ring fuse pairs is cancelled.

2. The electrical protection device according to claim 1, wherein the Tip/Ring fuse pairs are positioned substantially linearly with each other within the fuse housing.

3. The electrical protection device according to claim 1, wherein the Tip/Ring fuse pairs are arranged in alternating vertical and horizontal orientation.

4. The electrical protection device according to claim 3, wherein the fuse housing supports at least three Tip/Ring fuse pairs within the fuse housing.

5. The electrical protection device according to claim 1, and further comprising a communications connector connected to said fuse housing and including terminals connected to said fuses.

6. The electrical protection device according to claim 1, wherein the fuse housing includes a rear face and each Tip/Ring fuse pair comprises a pair of wire conductors that extend through the rear face of the fuse housing and exit therefrom as connector pins for respective Tip/Ring terminal pairs.

7. The electrical protection device according to claim 6, wherein each Tip/Ring fuse pair include a connector pin having a horizontal section and a riser section that extends downward from the horizontal section to engage a circuit board to which the fuse body is supported.

8. The electrical protection device according to claim 1, and further comprising a plurality of fuse holders each carrying a respective fuse within the fuse housing.

9. The electrical protection device according to claim 8, wherein each fuse holder carries a respective Tip/Ring fuse pair.

10. The electrical protection device according to claim 1, wherein the fuse housing includes fuse holder sockets into which fuses are removably received to enhance fuse replacement within the housing when a fuse is to be replaced.

11. An electrical protection device, comprising:
a fuse housing; and
a plurality of fuses carried by the fuse housing and arranged in a plurality of Tip/Ring fuse pairs, wherein the Tip/Ring fuse pairs are positioned linearly with each other within the fuse housing and arranged in alternating vertical and horizontal orientation of Tip/Ring fuse pairs, wherein an adjacent two Tip/Ring fuse pairs that are adjacent are spaced such that the distance from a centerline of a vertically oriented Tip fuse on a first Tip/Ring fuse pair to a centerline of a horizontally oriented Tip fuse on a second adjacent Tip/Ring fuse pair and the distance between a centerline of the Ring fuse on the first Tip/Ring fuse pair and a centerline of the Tip fuse on the second Tip/Ring fuse pair are substantially the same distance d1 and the distance from a centerline of the vertically oriented Tip fuse on the first Tip/Ring fuse pair to a centerline of the horizontally oriented Ring fuse on the second Tip/Ring fuse pair and the distance between a centerline of the Ring fuse on the first Tip/Ring fuse pair and a centerline of the Ring fuse on the second Tip/Ring fuse pair are substantially the same distance d2 wherein the distances d1 and d2 are such that differential crosstalk among Tip/Ring fuse pairs is cancelled.

12. The electrical protection device according to claim 1, wherein the fuse housing supports at least three Tip/Ring fuse pairs within the fuse housing.

13. The electrical protection device according to claim 11, and further comprising a communications connector connected to said fuse housing and including terminals connected to said fuses.

14. The electrical protection device according to claim 11, wherein the fuse housing includes a rear face and each Tip/Ring fuse pair comprises a pair of wire conductors that extend through the rear face of the fuse housing and exit therefrom as connector pins for respective Tip/Ring terminal pairs.

15. The electrical protection device according to claim 14, wherein each Tip/Ring fuse pair include a connector pin having a horizontal section and a riser section that extends downward from the horizontal section to engage a circuit board to which the fuse body is supported.

16. The electrical protection device according to claim 11, and further comprising a plurality of fuse holders each carrying a respective fuse within the fuse housing.

17. The electrical protection device according to claim 16, wherein each fuse holder carries a respective Tip/Ring fuse pair.

18. The electrical protection device according to claim 11, wherein the fuse housing includes fuse holder sockets into which fuses are removably received to enhance fuse replacement within the housing when a fuse is to be replaced.

19. An electrical protection system, comprising:
a plurality of fuse housing bodies positioned linearly and adjacent to each other; and
a pair of fuses positioned in each fuse housing body and arranged as a Tip/Ring fuse pair in one of a vertical or horizontal configuration, wherein each of the fuse housing bodies are arranged adjacent to each other such that the Tip/Ring fuse pairs are arranged in alternating vertical and horizontal orientation and spaced to each other a distance such that differential crosstalk among the Tip/Ring fuse pairs is cancelled.

20. The electrical system according to claim 19, wherein an adjacent two fuse housing bodies are spaced such that the distance from a centerline of the vertically oriented Tip fuse in a first fuse housing body to a centerline of the horizontally oriented Tip fuse in a second adjacent fuse housing body and the distance between a centerline of the Ring fuse in the first fuse housing body and a centerline of the Tip fuse in the second fuse housing body are substantially the same distance.

21. The electrical protection system according to claim 20, wherein an adjacent two fuse housing bodies are spaced such that the distance from a centerline of the vertically oriented Tip fuse in a first fuse housing body to a centerline of the horizontally oriented Ring fuse in a second adjacent fuse housing body and the distance between a centerline of the Ring fuse in the first fuse housing body and a centerline of the Ring fuse in the second fuse housing body are substantially the same distance.

22. The electrical protection system according to claim 19, wherein at least three fuse housing bodies are positioned adjacent to each other to support at least three adjacent Tip/Ring fuse pairs.

23. The electrical protection device according to claim 19, and further comprising a fuse holder that carries a respective fuse within the fuse housing body.

24. The electrical protection device according to claim 23, wherein each fuse holder carries a respective Tip/Ring fuse pair.

25. The electrical protection device according to claim 24, wherein each fuse housing body includes fuse holder sockets into which fuses are removably received.

* * * * *

UNITED STATES PATENT AND TRADEMARK OFFICE
CERTIFICATE OF CORRECTION

| | | |
|---|---|---|
| PATENT NO. | : 8,437,469 B1 | Page 1 of 1 |
| APPLICATION NO. | : 12/692904 | |
| DATED | : May 7, 2013 | |
| INVENTOR(S) | : Kevin Earnst | |

It is certified that error appears in the above-identified patent and that said Letters Patent is hereby corrected as shown below:

In the Claims

In Claim 20, Column 12, Line 14 – delete "electrical" and insert -- electrical protection --, therefor.

Signed and Sealed this
Twentieth Day of August, 2013

Teresa Stanek Rea
*Acting Director of the United States Patent and Trademark Office*